United States Patent [19]

Minegishi et al.

[11] Patent Number: 5,107,106
[45] Date of Patent: Apr. 21, 1992

[54] SCANNING AND DETECTING OPTICAL DEVICE

[75] Inventors: Isao Minegishi, Tokyo; Masaru Isono, Matsudo; Fumio Ohtomo, Asaka; Akihiko Sekine, Tokyo, all of Japan

[73] Assignee: Kabushiki Kaisha Topcon, Japan

[21] Appl. No.: 454,196

[22] Filed: Dec. 21, 1989

[30] Foreign Application Priority Data

Dec. 24, 1988 [JP] Japan .................. 63-327472

[51] Int. Cl.⁵ .............................................. H01J 3/14
[52] U.S. Cl. ......................................... 250/235; 358/481
[58] Field of Search .............. 250/235, 236; 358/481, 358/476; 350/6.7, 6.8

[56] References Cited

U.S. PATENT DOCUMENTS

| | | | |
|---|---|---|---|
| 4,190,867 | 2/1980 | Ohnishi | 358/481 |
| 4,243,294 | 1/1981 | Noguchi | 358/481 |
| 4,447,723 | 5/1984 | Neumann | 358/481 |
| 4,616,132 | 10/1986 | Kessler | 358/481 |
| 4,719,515 | 1/1988 | Miyagawa et al. | 358/481 |

*Primary Examiner*—David C. Nelms
*Assistant Examiner*—Que T. Le
*Attorney, Agent, or Firm*—Mason, Fenwick & Lawrence

[57] ABSTRACT

A scanning optical device having a light source for illuminating an examination object such as eyground of a humaneye, a scanning illumination system for scanning and illuminating the examination object with the light, and a light receiving system for guiding the light reflected from the examination object to a light-receiving section. The scanning optical device also has a synchronous signal generating optical system capable of directly guiding the light from the scanning illumination system to the light-receiving section without the intermediary of the examination object, and a synchronizing signal extraction device for separating a synchronizing signal exactly synchronous with the image signal from the signal derived from the light-receiving section.

6 Claims, 9 Drawing Sheets

SCANNING AND DETECTING OPTICAL DEVICE

BACKGROUND OF THE INVENTION

1. Field of the Invention

The present invention relates to scanning and detecting optical devices. More particularly, the invention is concerned with an apparatus which is capable of picking up an exact synchronizing signal.

2. Description of the Prior Art

Hitherto, it has been a common practice to pick up a synchronizing signal in image signals by means of a synchronizing signal detector which is arranged on a line of the scanning by light and which is separate from an image signal detector.

The above-described synchronizing signal detector essentially requires a photo-detector which is used exclusively for the purpose of detection of the synchronizing signal. When a magnifier lens is used, it is necessary to move the photo-detector each time the magnification is changed or to arrange a plurality of photo-detectors and to electrically switching them in accordance with the magnification. Thus, the conventional synchronizing signal detector is complicated in construction.

SUMMARY OF THE INVENTION

Accordingly, an object of the present invention is to provide a scanning optical device of the type having a scanning illumination system for scanning and illuminating an examination object, and a light-receiving system for guiding the light reflected from the examination object to a light-receiving section, improved in such a way as to permit an easy and efficient pick-up of a signal which is exactly synchronous with the image signal derived from the light-receiving section.

According to the present invention, the above and other objects can be accomplished by a scanning optical device having a light source for illuminating an examination object, a scanning illumination system for scanning and illuminating said examination object with the light, and a light receiving system for introducing the light reflected from said examination object to light-receiving means, characterized by comprising: a synchronous signal generating optical system capable of guiding the light from said scanning illumination system to said light-receiving means without the intermediary of said examination object; and a synchronizing signal extraction means for picking up a synchronizing signal exactly synchronous with the image signal out of the signal derived from said light-receiving means.

In a preferable aspect of the present invention, said synchronizing signal generating optical system has at least one optical member disposed on a line of scanning by said scanning illumination system so that a portion of the light from said scanning illumination system is guided to said light-receiving system by said optical member.

In another aspect of the present invention, said light is guided to said light-receiving means through an optical fiber having one end positioned on said line of scanning.

Further, a reflective member is disposed on said line of scanning so as to guide a portion of the scanning light to said light-receiving means, and said reflective member is disposed on a light path common to said scanning illumination system and said light-receiving system,so that the illuminating light is regularly reflected to return the light path so as to impinge upon the light-receiving section.

In further preferable aspect of the present invention, said reflective member is disposed at a position conjugate with said examination object within a range which is between said examination object and said scanning illumination system and in which said scanning illumination system and said light-receiving system are common.

DESCRIPTION OF THE PREFERRED EMBODIMENTS

Embodiments of the present invention will be described with reference to the accompanying drawings.

A first embodiment of the present invention is a scanning optical device of a so-called confocal type in which a light-receiving system makes use of a pair of movable mirrors commonly with an illumination system so that the light-receiving section receives the light reflected only by the illuminated portion of an eyeground as an examination object illuminated by the scanning light.

Figure 1:
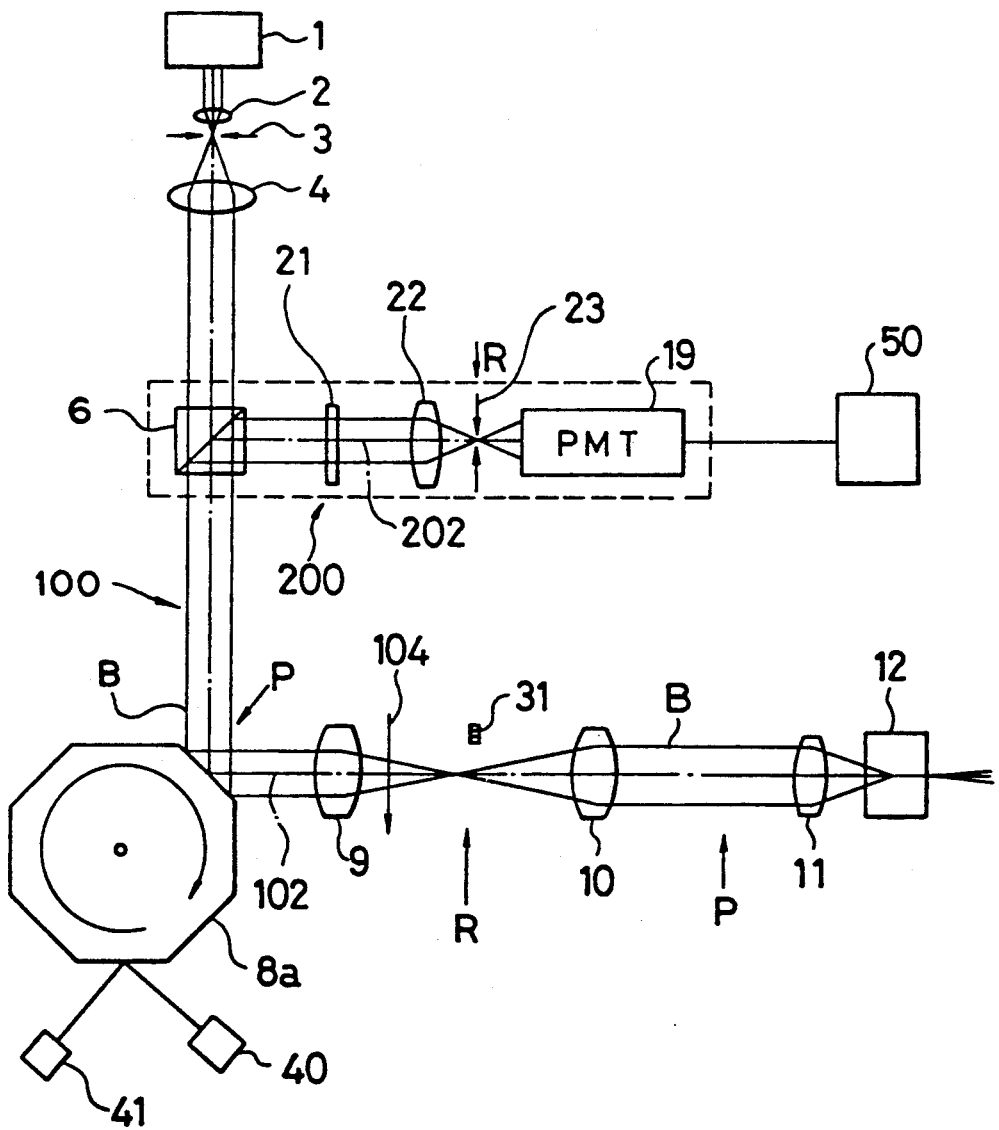
FIG. 1 is a diagrammatic illustration of an optical system incorporated in a first embodiment of the invention.
Figure 2:
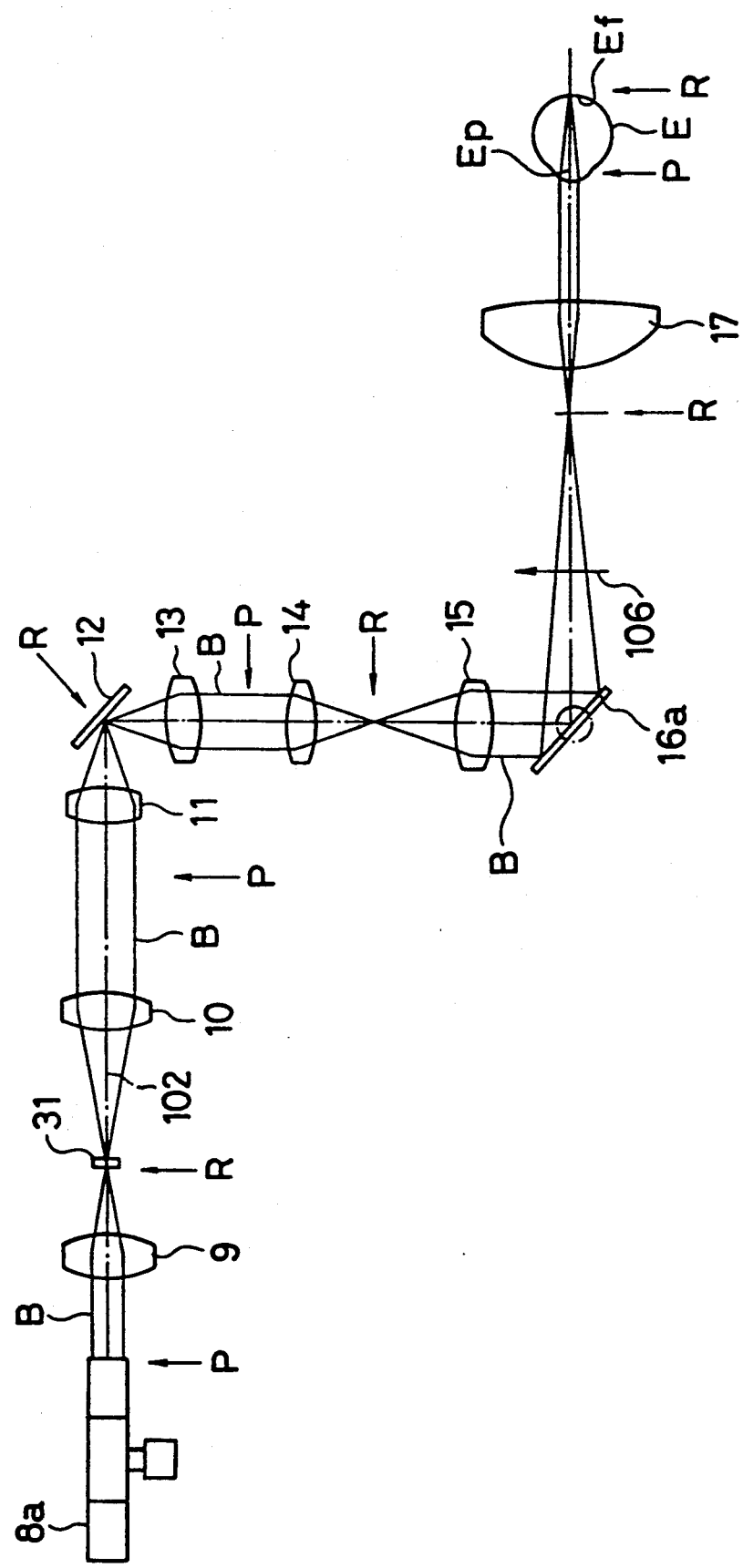
FIG. 2 is a side elevational view of the optical system shown in FIG. 1.

More specifically, as shown in FIGS. 1 and 2, the first embodiment of the scanning optical device of the present invention has a laser oscillator 1 as a light source, a scanning optical system 100, a light-receiving system which is partially common to the scanning illumination system 100, and a light-receiving section 19. In these Figures, P represents a position which is conjugate with the pupil $E_p$ of the eye E as an examination object, while R represents a position which is conjugate with the eyeground (retina) $E_f$.

The scanning illumination system 100 has a laser collimator 2 disposed in front of the laser oscillator 1, a pin-hole 3 disposed at the front focal point of the laser collimator 2, a collimator lens 4 the rear focal point of which is positioned on the pin-hole 3, and a polarization beam splitter 6 disposed in a collimated laser beam B formed by the collimator lens 4. The terms "front" and "rear" are used in this specification to mean, respectively, the side of the laser oscillator 1 adjacent to the eye E and the side of the adjacent to the light-receiving section 19.

The scanning illumination system 100 further has a polygon mirror 8a disposed on the front side of the polarization beam splitter 6 and capable of oscillating the beam for the scanning purpose, a magnification lens 9 arranged on the reflection optical axis 102 of the polygon mirror, a diffusion reflective plate 31 disposed at the front focal point of the magnification lens 9 and outside the optical axis 102, and a magnification lens 10 which has the rear focus at the point where the extension plane of the scattering reflective plate 31 crosses the optical axis 102. A light-emitting element 40 and a light-receiving element 41 are disposed at one side of the polygon mirror 8a so as to optically oppose each other through a reflective surface of the polygon mirror 8a thereby to detect that all the reflective surfaces of the polygon mirror are directed in predetermined directions. The laser beam B flies in the direction of the arrow 104 when the polygon mirror 8a rotates clockwise.

As shown in FIG. 2, the scanning illumination system further has a relay lens 11 disposed in the path of a collimated laser beam B formed by the magnification lens 10, a reflective mirror 12 obliquely arranged at the front focal point of the relay lens 11, a focus lens 13 having the rear foal point located on the reflective mirror 12, a focus lens 14 disposed in the collimated laser beam B formed by the focus lens 14, a relay lens 15 for receiving the laser beam converged by said focus lens 14 and then diverged, so as to converge again the received diverged light, and a gulvano-mirror 16 capable of rotating counter-clockwise thereby to enable the beam to scan an object.

The scanning illumination system 100 further has an objective lens 17, the rear focus of which is located at the point where the beam converged through the relay lens 15 is focused. The objective lens 17 is arranged to oppose the eye E as the examination object. $E_p$ and $E_f$ respectively represent the pupil and the retina of the eye E.

Figure 3:
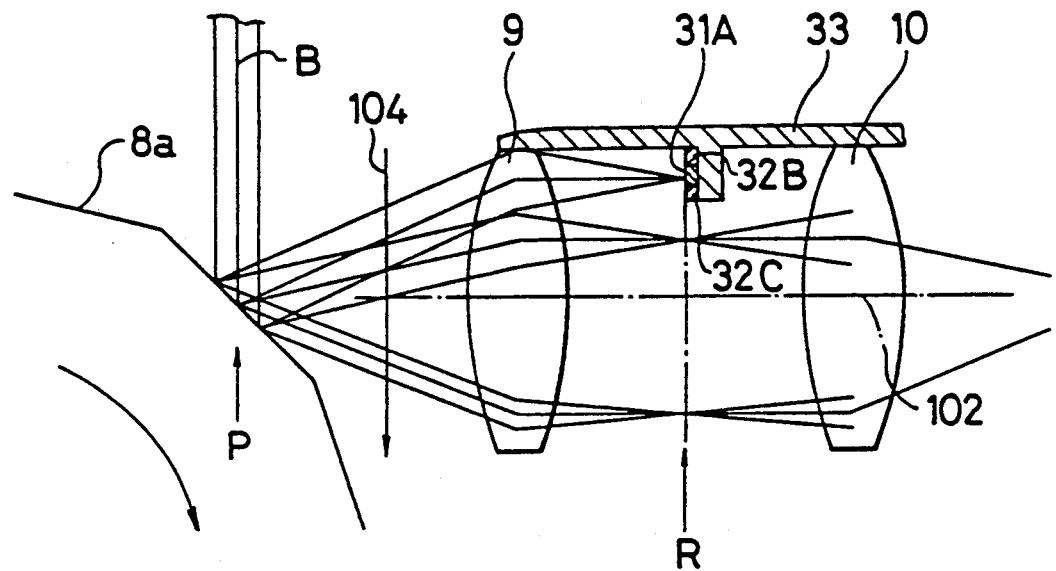
FIG. 3 is an enlarged view of a portion of the first embodiment around a diffusion reflective plate.
Figure 4:
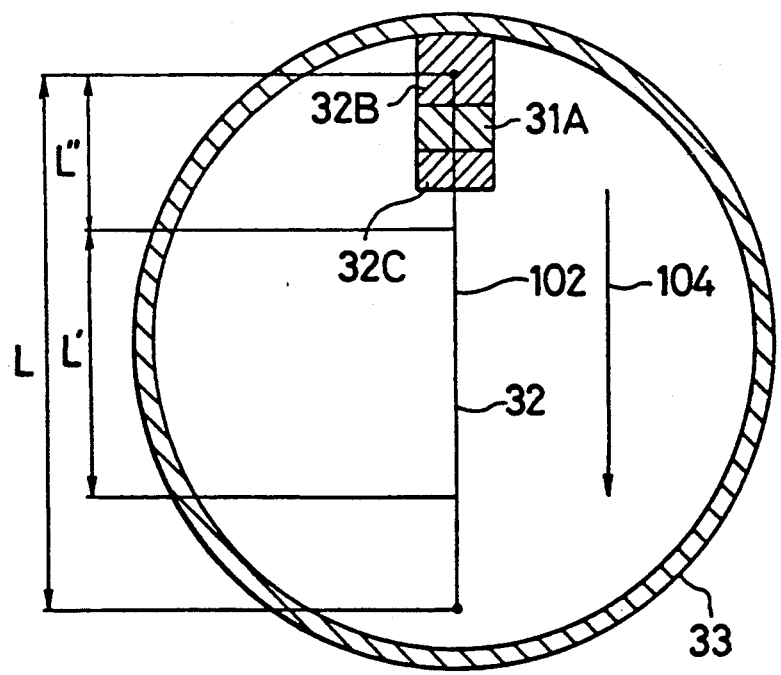
FIG. 4 is a front elevational view of a diffusion reflective plate.

The diffusion reflective plate 31 has a diffusion surface 31A and anti-reflection surfaces 32B, 32C on both sides of the diffusing surface 31A, as will be seen from FIG. 3 which is an enlarged view around the reflective plate 31 and FIG. 4 which is a front elevational view of the same. The diffusing reflective plate 31 is fixed to the lens barrel 33 of the magnification lenses 9, 10 at an offset from the optical axis 102. As will be seen from FIG. 4, the diffusion reflective plate 31 is located on the line 32 of scan by the optical axis of the light from the polygon mirror 8. As will be seen from FIG. 4, the size of the diffusion reflective plate 31 is so determined as to correspond to a period L" which is within the period L of the scanning by the laser beam and which is before entering the effective period L' of scan by the laser beam. The anti-reflection surfaces 32B and 32C are provided for enabling discrimination of the synchronizing signal and the image signal from each other. The diffusion reflective plate 31 may be a disk having a circular or an elliptical hole centered at the optical axis.

In operation of the scanning illumination system 100, the laser beam from a laser oscillator 1 is collimated through the laser collimator lens 2, the pin-hole 3 and the collimator lens 3 and is reflected by the polygon mirror so as to scan in the direction of the arrow 104. The laser beam B is then relayed through the relay lenses 10, 11 and is focused on the retina $E_f$ through focusing lenses 13 and 14. The laser beam is deflected in the direction of an arrow 106 at each scan so that it scans the retina $E_f$.

On the other hand, a part of the scanning laser beam passing through the magnification lens 9 is reflected by the diffusion reflective plate 31 so as to form a synchronizing signal, and traces the scanning illumination system backward.

The light-receiving system 200 has a portion which is not common to the scanning illumination system 100. As shown in FIG. 1, this portion of the light-receiving system 200 includes an analyzer 21 disposed on the reflection optical axis 202 of the deflection beam splitter 6, a condenser lens 22 disposed at the front side of the analyzer 21, a pin-hole 23 disposed at the front focal point of the analyzer 21, and a light-receiving section 19 disposed in front of the pin-hole 23.

In operation of the light-receiving system 200, the laser beam containing an image signal reflected from the retina $E_f$ and a synchronizing signal reflected by a diffusion reflective plate 31 is reflected by the polygon mirror 8a and the polarization beam splitter 6 and is introduced into the analyzer 21 which delivers to the light-receiving section 19 only the laser beam component of a specific deflection without no noise component.

Figure 5:
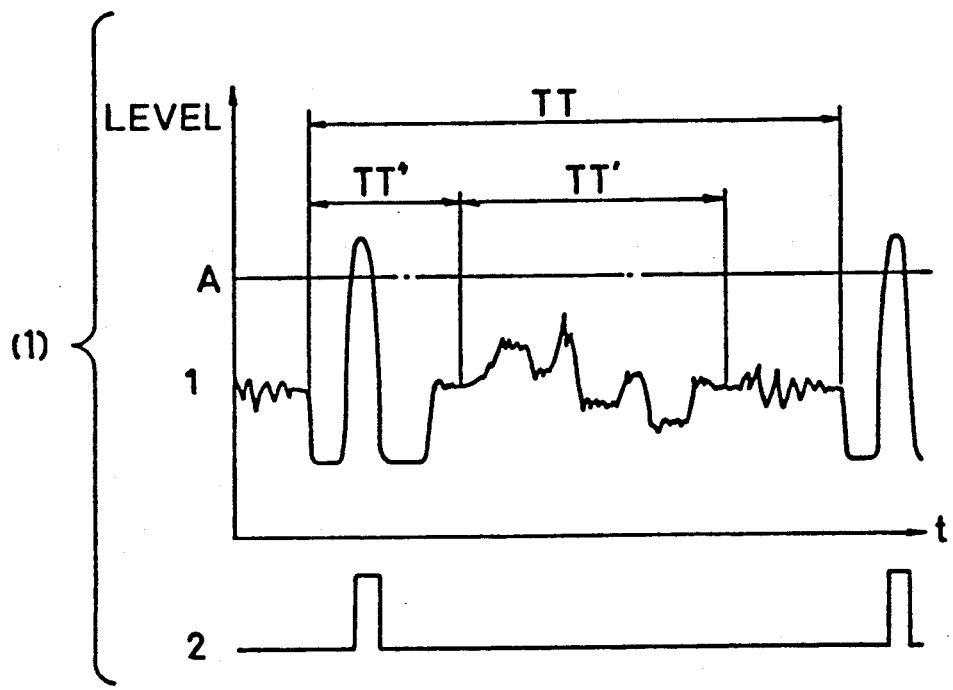
FIG. 5 is a waveform chart showing signals obtained from the light-receiving section in the first embodiment.
Figure 5A:
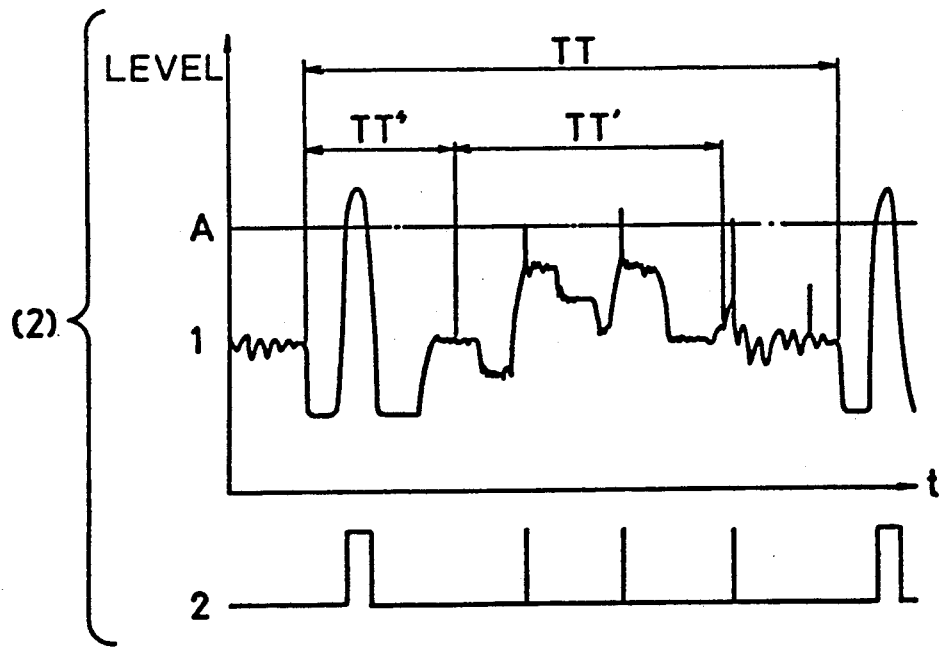

A description will be given of the synchronization detection method for picking up a synchronizing signal from the signal derived from the light-receiving section. As shown in section (1) of FIG. 5, the signal derived from the light-receiving section 19 contains a synchronizing signal produced by the diffusion reflective plate 31 and an image signal obtained from the retina $E_f$. It is necessary to pick-up only the synchronizing from the signal obtained from the light-receiving section 19. The periods TT, TT; and TT" in this Figure correspond to the periods L, L' and L" in FIG. 4.

It will be understood that the synchronizing signal has a level higher than the image signal TT; from the retina because it is received by the light-receiving system 200 as a synchronizing light signal which is obtained directly from the laser beam B through diffusion and reflection performed by the diffusion reflective plate 31. It is therefore possible to pick-up the synchronizing signal , by binarizing the signal at a level A which is higher than the level of the image signal as shown in section (1) of FIG. 5. This method, however, is not practically recommended because, when a signal of a level higher than than A is contained in the signal due to, for example, noise, it is difficult to discriminate the synchronizing signal in the signal (2) obtained after the binarization.

According to the invention, therefore, anti-reflection surfaces 32B and 32 C are arranged on both sides of the diffusion surface 31A so as to provide a distinction between the region of the synchronizing signal and the image signal, and the synchronizing signal is separated by means of an window signal.

A method of separation of the synchronizing signal and the image signal from each other will be described with reference to FIG. 6 which is a block diagram of a synchronizing signal separating section 50 and FIG. 7 which is a timing chart illustrating timings of various signals.

Figure 7:
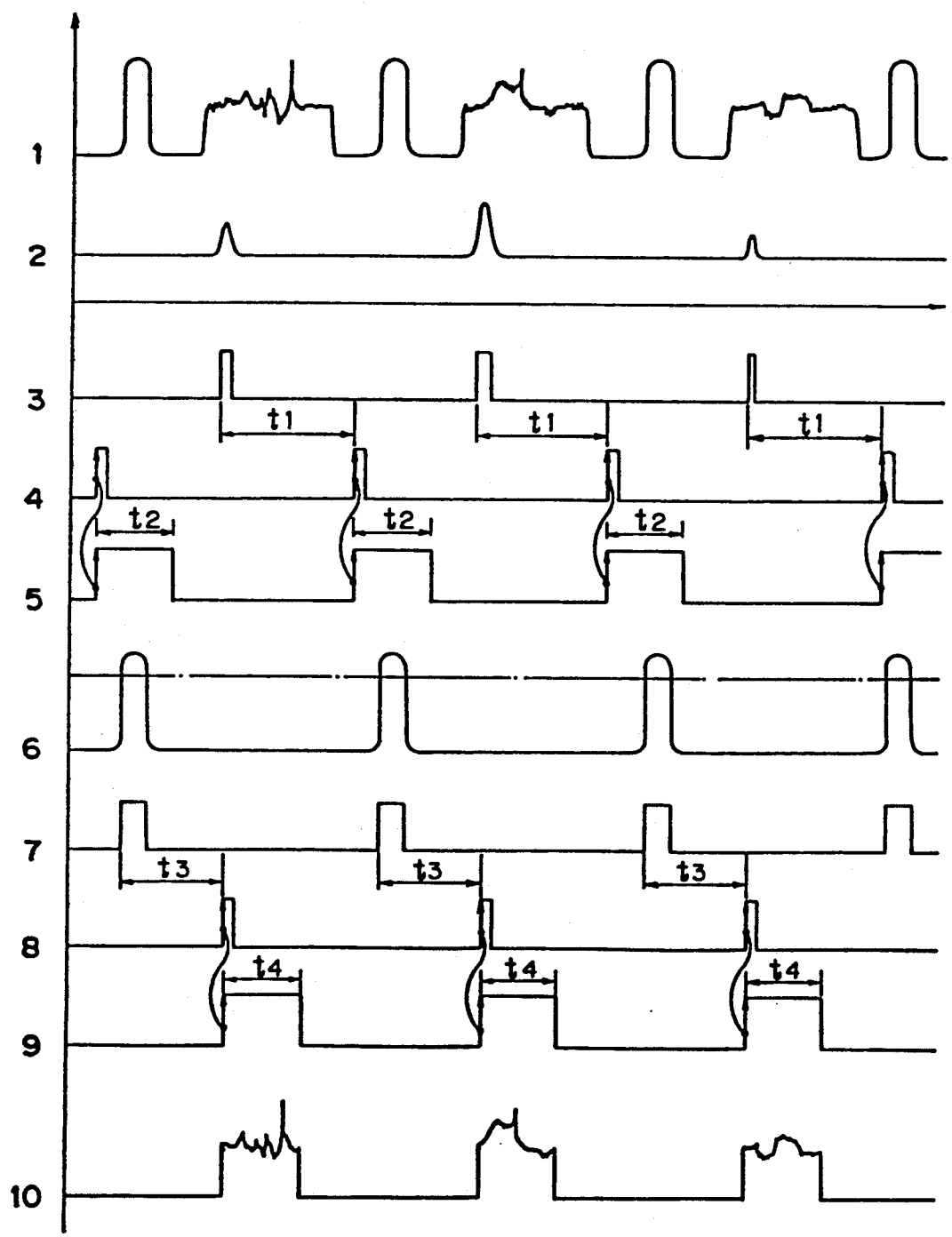
FIG. 7 is a time chart illustrating the operations of the blocks shown in FIG. 6.

The signal derived from the light-receiving section 19 is shown in of FIG. 7. From this Figure, it will be understood that the region of the synchronizing signal and the region of the image signal are distinctively determined by virtue of the provision of the antireflection surfaces 32B, 32C on both sides of the diffusion surface 31A. The signal for each reflection surface obtained from the light-receiving element 41 is indicated by in FIG. 7. The separation of the synchronizing signal and the image signal from each other is conducted by using these two signals.

Figure 6:
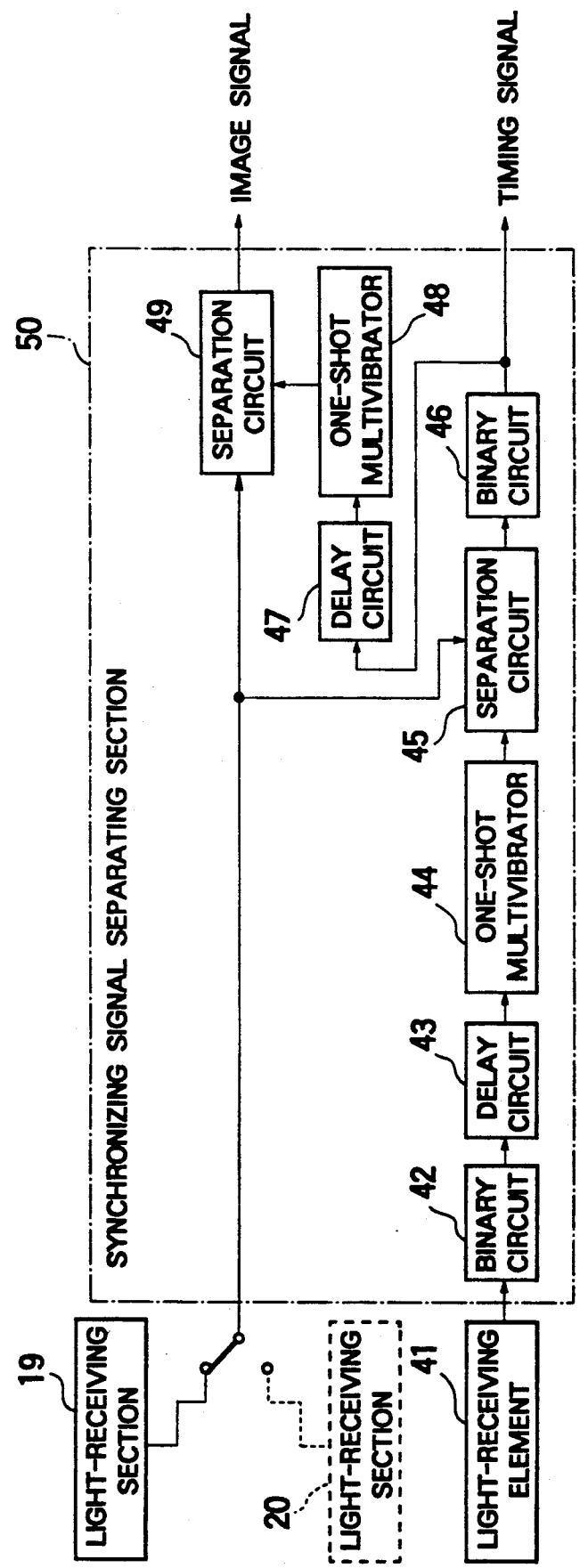
FIG. 6 is a block diagram of an electric system.

As will be seen from the block diagram in FIG. 6, the signal of FIG. 7 derived from the light-receiving element 41 is binarized by a binary circuit 42 so that a signal of a waveform indicated by in FIG. 7 is obtained. This signal is then delayed by a time $t_1$ through a delay circuit 43, so that a delayed signal is obtained as shown in FIG. 7.

On the other hand, a synchronizing window signal, indicated at in FIG. 7, is generated throughout a period $t_2$ by means of a one-shot multivibrator 44. This window signal is input to the separation circuit 45 together with the signal of FIG. 7 derived from the light-receiving section, so that the synchronizing signal component is separated from the signal as indicated at in FIG. 7. This signal is then binarized by a binary circuit 46 so that the synchronizing signal is obtained as shown in FIG. 7.

On the other hand, the synchronizing signal is delayed by a time $t_3$ through a delay circuit 47 so that a signal is obtained as shown in FIG. 7, and an image window signal is produced for a period $t_4$ by a one-shot multivibrator 48. This signal is input to a separation circuit 49 together with the signal from the light-receiving section, whereby an image signal component (10) is obtained.

Description will be given of second and third embodiments of the invention. These embodiments are scanning optical devices of so-called non-confocal type in which the light-receiving system does not make use of two mirrors of the illumination system so that the light-receiving system always receives the light reflected from the whole area of the retina $E_f$ of the examined eye.

Figure 8:
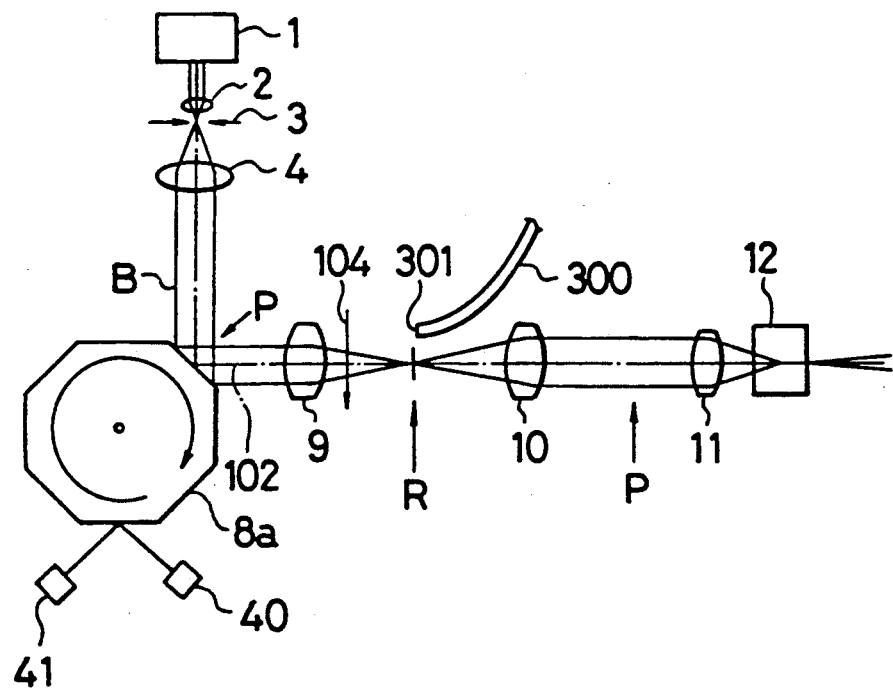
FIG. 8 is a diagrammatic illustration of an optical system incorporated in a second embodiment of the present invention.
Figure 9:
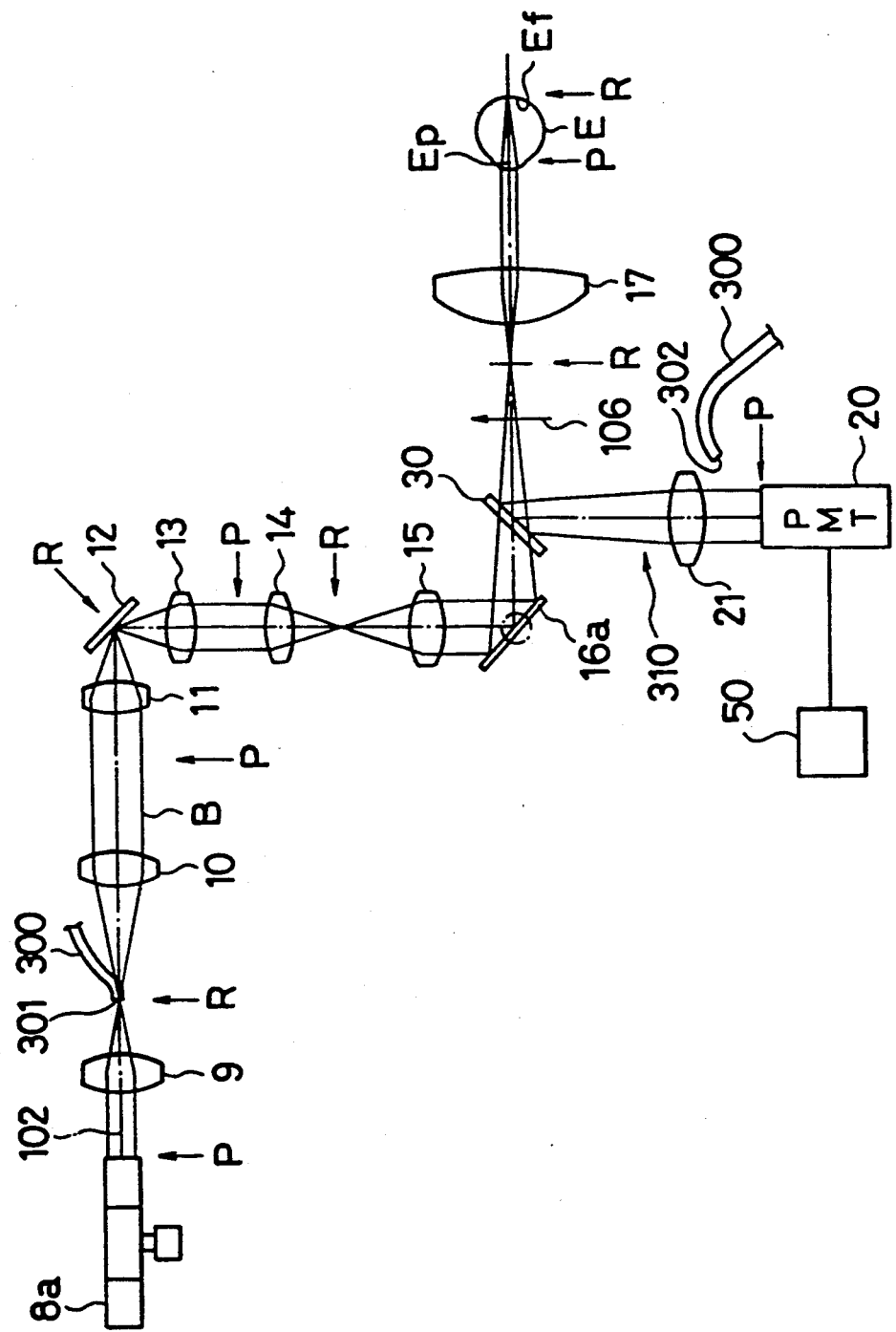
FIG. 9 is a side elevational view of the optical system shown in FIG. 8.

The second embodiments are shown in FIGS. 8 and 9, in which the components common to the first embodiment are denoted by the same reference numerals and detailed description of such components is omitted. This embodiment employs a light guide 300 disposed at the front focal position of the magnification lens 9 at an offset from the optical axis 104, i.e., at the position corresponding to that of the diffusion reflective plate 31 of the first embodiment, with the incident end surface 301 of the light guide faces the magnification lens 9.

The light-receiving system 310 includes a half mirror 30 obliquely arranged at a position between the gulvano-mirror 16a and the relay lens 15, analyzer 21, and a light-receiving section 20. The light emerging end surface 302 of the light guide 300 faces the light-receiving section 20.

Figure 10:
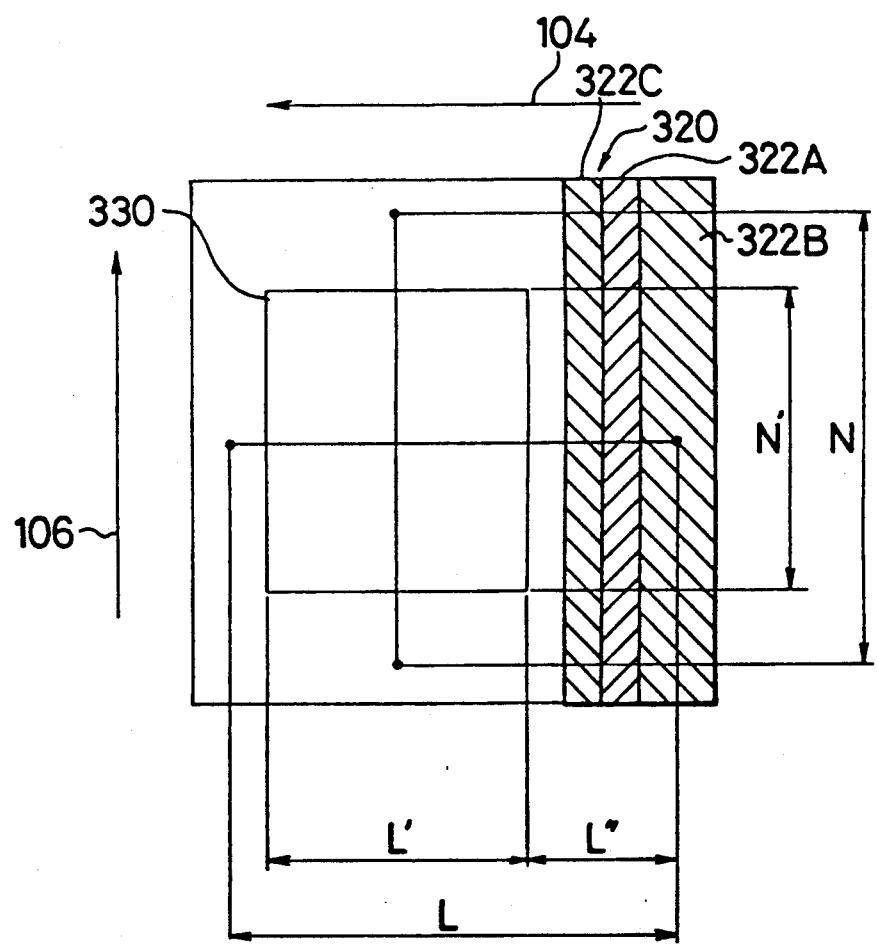
FIG. 10 is a front elevational view of a diffusion reflective plate incorporated in the third embodiment.

The third embodiment employs a half mirror disposed at the front focal position of the release lens 15 as shown in FIG. 9. A light-receiving section of the same construction as the light-receiving section 310 of the second embodiment is disposed on the axis of the light reflected by the half mirror. In this case, the diffusion reflective plate 320 is disposed at a position R which is conjugate with the retina $E_f$ of the examined eye. As shown in FIG. 10, the diffusion reflective plate 320 has a diffusion reflective surface 322A which is sized to cover the period N of scanning in the direction of an arrow 105 in the period L" before the effective scanning, in the area 330 of the effective scanning, and anti-reflection surfaces 322B, 322C which are arranged on the left and right sides of the diffusion reflective surface 322A.

Processing of signals in the second and third embodiments is conducted in the same manner as the first embodiment.

According to the present invention, the image signal and the synchronizing signal are produced by a common illuminating light and are derived from the same light-receiving section, so that a synchronizing signal exactly synchronous with the image signal can be obtained by means of a simple arrangement.

What is claimed is:

1. A scanning and detecting optical device having (1) a light source for illuminating an examination object, (2) a scanning illumination system for scanning and illuminating said examination object with the light, and (3) a light receiving system for introducing light reflected from said examination object to a light-receiving means, the device comprising:

a synchronous signal generating optical system for generating a synchronizing signal and guiding said synchronizing signal from said scanning illumination system to said light-receiving means without the intermediary of said examination object; and a synchronizing signal extraction means, connected to the light receiving means and receiving from the light receiving means a signal including (a) the synchronizing signal and (b) an image signal for extracting the synchronizing signal.

2. A scanning and detecting optical system according to claim 1, wherein said synchronizing signal generating optical system has at least one optical member disposed on a line of scanning by said scanning illumination system so that a portion of the light from said scanning illumination system is guided to said light-receiving system by said optical member.

3. A scanning and detecting optical system according to claim 2, wherein said the light is guided to said light-receiving means through an optical fiber having one end positioned on said line of scanning.

4. A scanning and detecting optical system according to claim 2, wherein a reflective member is disposed on said line of scanning so as to guide a portion of the scanning light to said light-receiving means.

5. A scanning and detecting optical device according to claim 4, wherein said reflective member is disposed on a light path common to said scanning illumination system and said light-receiving system, so that the illuminating light is regularly reflected to return the light path so as to impinge upon the light-receiving means.

6. A scanning and detecting optical device according to claim 5, wherein said reflective member is disposed at a position conjugate with said examination object within a range which is between said examination object and said scanning illumination system and in which said scanning illumination system and said light-receiving system are common.

* * * * *